United States Patent
Ishida

(10) Patent No.: US 7,156,544 B2
(45) Date of Patent: Jan. 2, 2007

(54) VEHICLE HEADLAMP

(75) Inventor: Hiroyuki Ishida, Shizuoka (JP)

(73) Assignee: Koito Maunufacturing Co., Inc, Tokyo (JP)

( * ) Notice: Subject to any disclaimer, the term of this patent is extended or adjusted under 35 U.S.C. 154(b) by 105 days.

(21) Appl. No.: 10/947,167

(22) Filed: Sep. 23, 2004

(65) Prior Publication Data

US 2005/0068787 A1   Mar. 31, 2005

(30) Foreign Application Priority Data

Sep. 29, 2003   (JP)   ............ P. 2003-338448

(51) Int. Cl.
*B60Q 1/064*   (2006.01)
(52) U.S. Cl. ............ 362/538; 362/511; 362/539; 362/545
(58) Field of Classification Search ............ 362/538, 362/539, 511, 545
See application file for complete search history.

(56) References Cited

U.S. PATENT DOCUMENTS

2003/0090906 A1 * 5/2003 Hayakawa ............ 362/517
2004/0027833 A1 * 2/2004 Amano et al. ............ 362/507

FOREIGN PATENT DOCUMENTS

JP   2003-123517 A   4/2003
WO   WO 02/076788 A1 * 10/2002

* cited by examiner

*Primary Examiner*—Renee Luebke
*Assistant Examiner*—Mary Zettl

(57) ABSTRACT

A vehicle headlamp includes a projector-type lamp unit that performs two types of light distribution. The lamp unit is configured with a projection lens disposed on an optical axis Ax extending in an longitudinal direction of a vehicle, and a first light-source unit and a second light-source unit, both disposed to the rear of the projection lens. A low-beam light distribution pattern having sharp cut-off lines at an upper end portion is formed upon illumination of the first light-source unit. An additional high-beam light distribution pattern spreading upward from the cut-off lines is additionally formed upon illumination of the second light-source unit. Accordingly, a high-beam light distribution pattern is formed.

17 Claims, 9 Drawing Sheets

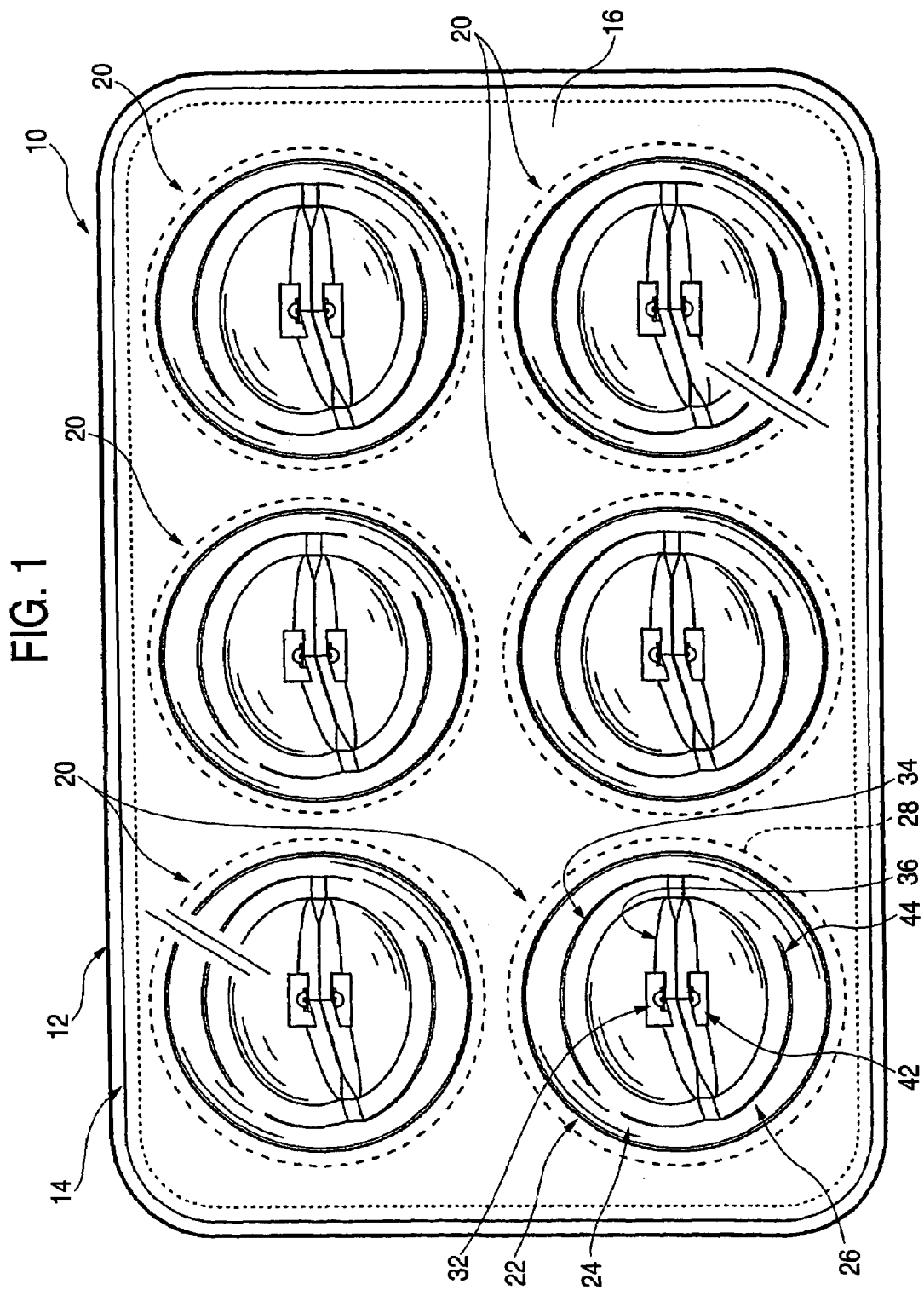

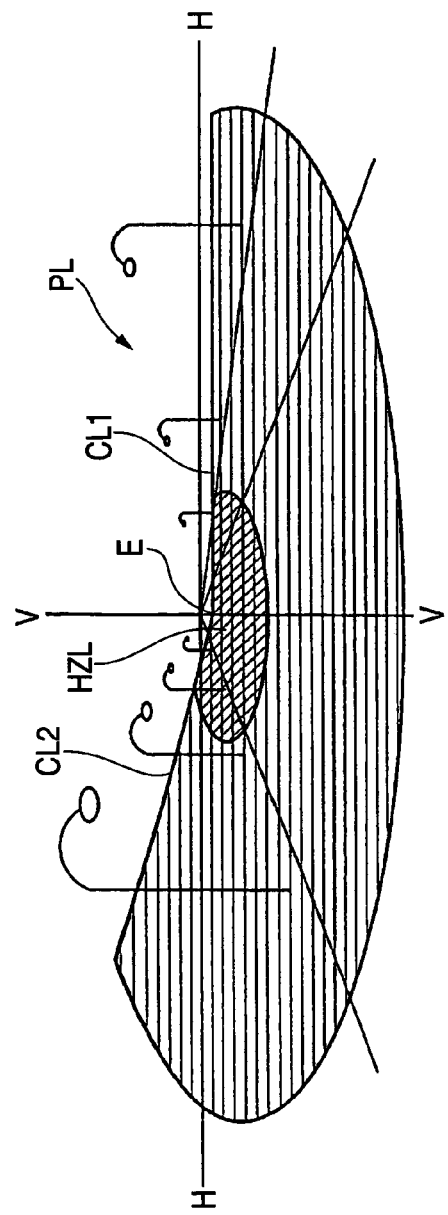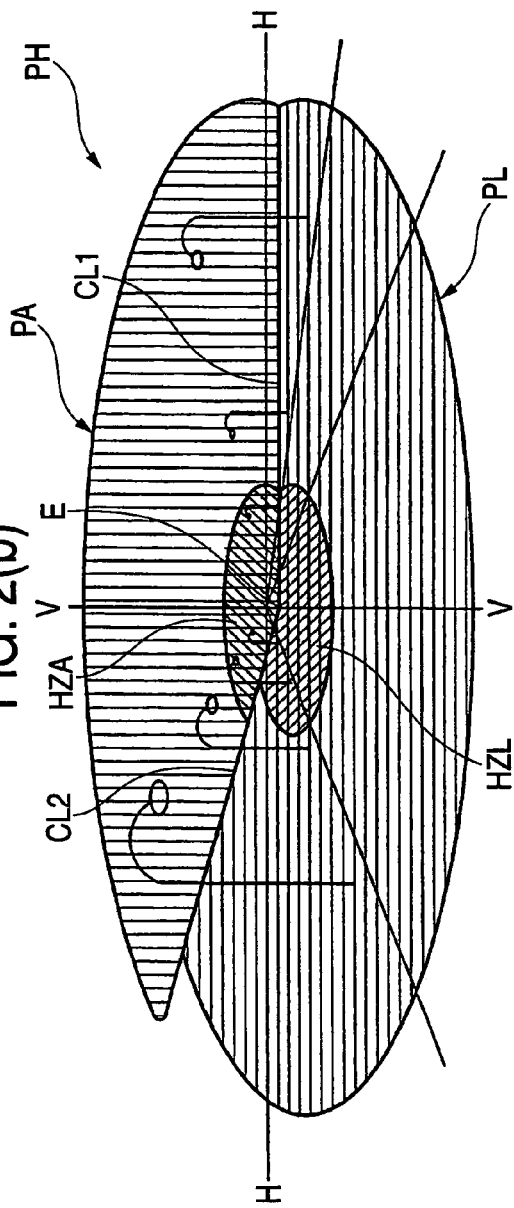

VEHICLE HEADLAMP

This application claims foreign priority from Japanese Patent Application No. 2003-338448, filed on Sep. 29, 2003, the contents of which is incorporated herein by reference in its entirety.

BACKGROUND OF THE INVENTION

1. Technical Field

The present invention relates to a vehicle headlamp which is configured to form light distribution patterns by light radiation from lamp units which employ semiconductor light-emitting elements as light sources.

2. Related Art

As described in JP-A-2003-123517, a related art vehicle lamp including a plurality of lamp units that employ semiconductor light emitting elements as light sources has been conventionally known.

A related art vehicle headlamp is generally configured to allow switching between a low-beam and a high-beam. A low-beam light distribution pattern having sharp cut-off lines at an upper end portion can be formed when a so-called projector-type lamp unit is employed as the lamp unit, and a light-shielding member is disposed at a rear focal point of the projection lens. In a projector-type lamp unit, light from a light source is reflected to a position closer to the optical axis of the projection lens by a reflector and is substantially converged in the vicinity of a rear focal point of the projector lens. The light-shielding member shields a part of light reflected from the reflector.

However, when a lamp unit is provided with only such a light-shielding member, the lamp unit becomes a low-beam-only lamp unit that forms only a low-beam light distribution pattern. As a result, and another lamp unit for forming a high-beam light distribution pattern is required.

When a semiconductor light-emitting element is employed as a light source of a lamp unit, disposing a plurality of lamp units is preferable to ensure a desired brightness. However, when a lamp unit for low-beam and a lamp unit for high-beam are configured independently, there arises a related art problem that a number of lamp units required for a vehicle headlamp becomes considerably large.

SUMMARY OF THE INVENTION

The present invention has been conceived in view of the above circumstances and provides a vehicle headlamp configured to form light distribution patterns by light radiation from lamp units which employ semiconductor light-emitting elements as light sources. The lamp unit enables formation of a low-beam light distribution pattern having sharp cut-off lines at an upper end portion and ensures a desired brightness while suppressing the number of lamp units to be disposed.

Other objects disclosed herein, objects not disclosed herein, or no objects at all, may be achieved by the exemplary, non-limiting embodiments of the present invention.

The present invention aims at achieving at least the above object, by adopting a so-called projector-type lamp unit as a lamp unit whose light source is a semiconductor light-emitting element, and by making contrivance to the configuration thereof.

Specifically, a vehicle headlamp of the present invention is configured so as to form light distribution patterns by means of light radiation from lamp units which employ semiconductor light-emitting elements as light sources.

The lamp unit has a projection lens disposed on an optical axis extending in a longitudinal direction of a vehicle, a first light-source unit disposed to the rear of the projection lens, and a second light-source unit disposed to the rear of the projection lens.

The first light-source unit has a first semiconductor light-emitting element, a first reflector, and a forward travel blocking member. The first semiconductor light-emitting element faces substantially upward on a first reference axis extending substantially in the longitudinal direction of the vehicle. The first reflector is configured so as to reflect light from the first semiconductor light-emitting element forward and close to the first reference axis, thereby substantially converging the reflected light in the vicinity of a rear focal point of the projection lens. The forward travel blocking member is formed into a shape extending rearward from the vicinity of the rear focal point so as to prevent the light reflected from the first reflector from traveling forward.

The second light-source unit has a second semiconductor light-emitting element, and a second reflector. The second semiconductor light-emitting element faces substantially downward on a second reference axis extending substantially in the longitudinal direction of the vehicle. The second reflector is configured so as to reflect light from the second semiconductor light-emitting element forward and close to the second reference axis, thereby substantially converging the reflected light in the vicinity of the rear focal point of the projection lens.

Illumination of the second light-source unit results in formation of a low-beam light distribution pattern which has cut-off lines at an upper end portion as reverse projection images of a front edge of the forward travel blocking member. Further, illumination of the second light-source unit results in formation of an additional high-beam light distribution pattern which spreads upward from the cut-off lines.

The vehicle headlamp of the invention may be configured to include only a single lamp unit, or a plurality of lamp units. In either case, the vehicle headlamp may be configured to include a lamp unit of a type other than the above-mentioned lamp unit.

Each of the first reference axis and the second reference axis may be an axis which coincides with the optical axis, or may be an axis which does not coincide with the optical axis. In addition, the first reference axis and the second reference axis may coincide with each other or may not coincide.

The present invention has various advantages. For example, but not by way of limitation, as shown by the configuration set forth, the vehicle headlamp of the present invention is configured in such a manner that light distribution patterns are formed by light radiation from lamp units which employ semiconductor light-emitting elements as light sources. The lamp unit is configured as a projector-type lamp unit having a projection lens disposed on an optical axis extending in a longitudinal direction of a vehicle, and a first light-source unit and a second light-source unit disposed to the rear of the projection lens, thereby performing two types of light distribution functions. Therefore, the following working effects can be obtained.

That is, when the first light-source unit is illuminated, light from a first semiconductor light-emitting element—which faces substantially upward on a first reference axis extending in a substantially longitudinal direction of the vehicle—is substantially converged in the vicinity of a rear focal point of the projection lens after being reflected forward and close to the first reference axis by a first reflector. However, a part of the reflected light is prevented from traveling forward by a forward travel blocking member which is formed so as to extend rearward from the rear focal point of the projection lens in a surface shape. Accordingly, there can be formed a low-beam light distribution pattern having sharp cut-off lines on an upper end portion as reverse projection images of a front edge of a surface of the forward travel blocking member.

In addition, when the second light-source unit is illuminated, light from a second semiconductor light-emitting element—which faces substantially downward on a second reference axis extending substantially in the longitudinal direction of the vehicle—is substantially converged in the vicinity of the rear focal point of the projection lens after being reflected forward and close to the second reference axis by a second reflector. Accordingly, there can be formed an additional high-beam light distribution pattern which spreads upward from the cut-off lines.

As described hitherto, when the first light-source unit is illuminated, the low-beam light distribution pattern having sharp cut-off lines can be formed. When the second light-source unit is additionally illuminated, the high-beam light distribution pattern—which is a composite light distribution pattern of the low-beam light distribution pattern and the additional high-beam light distribution pattern—can be formed. Therefore, brightness which is substantially equal to that attained when a low-beam lamp unit and a high-beam lamp unit are independently configured can be secured while suppressing a number of the lamp units to be disposed. Further, the first and second light-source units can be disposed adjacently with respect to the vertical direction. Accordingly, the above-mentioned working effect can be obtained while the lamp unit is maintained at a compact size.

As has been described, the present invention provides a vehicle headlamp which is configured so as to form light distribution patterns by means of light radiation from lamp units which employ semiconductor light-emitting elements as light sources. The lamp unit enables formation of a low-beam light distribution pattern having sharp cut-off lines at an upper end portion as well ensuring a desired brightness while suppressing a number of lamp units to be disposed.

As has been described, the forward travel blocking member of the first light-source unit is not limited to a specific configuration. However, when a surface of the forward travel blocking member is configured as a reflecting surface, light entering the surface of the forward travel blocking member after having been reflected on the first reflector can be reflected on the surface, to thus allow the reflected light to enter the projection lens. As a result, the low-beam light distribution pattern can be brightened further.

Also, when the second light-source unit is configured so as to include a reflecting member having a surface shape which is formed to extend rearward from the vicinity of the rear focal point of the projector lens to thereby reflect a part of light reflected from the second reflector, light entering the surface of the reflecting member after having been reflected on the second reflector can be reflected on the surface. Thereby, the reflected light is allowed to enter the projection lens. As a result, the additional high-beam light distribution pattern and, by extension, the high-beam light distribution pattern can be brightened further.

When the reflecting member of the second light-source unit is formed integrally with the forward travel blocking member of the first light-source unit, the following working effect can be obtained.

Specifically, in view of preventing formation of an unilluminated zone in the high-beam light distribution pattern, the additional high-beam light distribution pattern is preferably formed so as not be separated from the cut-off lines of the low-beam light distribution pattern. In the case where a reflecting member is provided on the second light-source unit, when a front edge of a surface of the reflecting member is caused to coincide with the front edge of the surface of the forward travel blocking member, the additional high-beam light distribution pattern can be formed without being deviated from the cut-off lines of the low-beam light distribution pattern. In this case, when the reflecting member of the second light-source unit is formed integrally with the forward travel blocking member of the first light-source unit, the front edge of the surface of the reflecting member and the front edge of the surface of the forward travel blocking member can be easily caused to coincide.

In the above configuration, the first reflector, which is a constituent of the first light-source unit, and the forward travel blocking member can be configured into a single first translucent block. When such a configuration is employed, miniaturization and reduction in the number of components of the first light-source unit can be achieved. Simultaneously, a positional relation between the reflecting surface of the first reflector and the forward travel blocking member can be set accurately. As a result, the cut-off lines of the low-beam light distribution pattern can be easily formed sharp.

Further, in the above configuration, the second reflector, which is a constituent of the second light-source unit, and the reflecting member can be configured into a single second translucent block. When such a configuration is employed, miniaturization and reduction in the number of components of the second light-source unit can be achieved.

In the above configuration, when the first semiconductor light-emitting element and the second semiconductor light-emitting element are positioned so as to deviate in a longitudinal direction, the first reference axis of the first light-source unit and the second reference axis of the second light-source unit can be caused to be closer to the optical axis of the projection lens. Accordingly, a position where light from the first and second light-source units enters the projection lens can be set so as not to be excessively separated from the optical axis. As a result, an outer diameter of the projection lens can be suppressed to a small size.

BRIEF DESCRIPTION OF THE DRAWINGS

FIG. 1 is a front view showing a vehicle headlamp according to a first exemplary, non-limiting embodiment of the present invention;

FIGS. 2A and 2B are perspective views showing light distribution patterns formed by light radiated forward from respective lamp units of the first exemplary, non-limiting embodiment of the present invention, which configures a vehicle headlamp, on a virtual vertical screen disposed at a position 25 m ahead of the lamp, wherein FIG. 2A shows a low-beam light distribution pattern and FIG. 2B shows a high-beam light distribution pattern;

DETAILED DESCRIPTION

Figure 3:
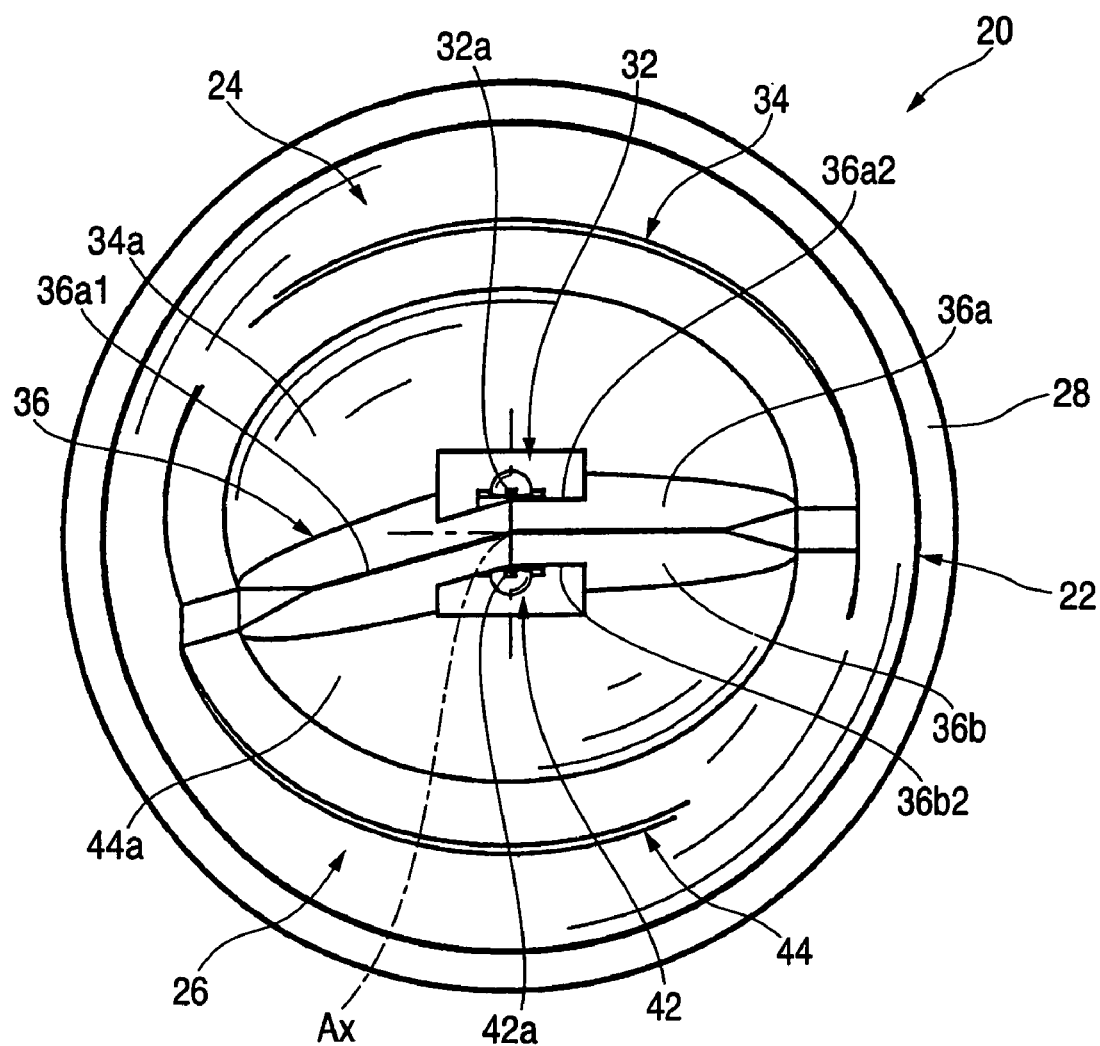
FIG. 3 is a front view showing the lamp unit of the first exemplary, non-limiting embodiment of the present invention as a single article.

An embodiment of the present invention will be described hereinafter by reference to the drawings.

FIG. 1 is a front view showing a vehicle headlamp according to a first exemplary, non-limiting embodiment of the present invention. A vehicle headlamp 10 comprises six lamp units 20 housed in two rows, an upper row and a lower row, within a lamp chamber. The lamp chamber comprises a lamp body 12, and a translucent cover 14 disposed at a front end opening of the lamp body 12. The respective six lamp units 20 are analogous in configuration. An inner panel 16 is disposed in the lamp chamber so as to surround the lamp units 20.

FIGS. 2A and 2B are perspective views showing light distribution patterns formed by light radiated forward from the respective lamp units 20 on a virtual vertical screen disposed at a position 25 m ahead of the lamp. FIG. 2A shows a low-beam light distribution pattern, and FIG. 2B shows a high-beam light distribution pattern.

As shown in FIG. 2A, the low-beam light distribution pattern PL is a left-oriented low beam pattern having a horizontal cut-off line CL1, and an oblique cut-off line CL2 which rises at an angle (e.g., about 15°) from the horizontal cut-off line CL1 at an upper end edge of the light distribution pattern. An elbow point E, which is an intersection point between the cut-off lines CL1 and CL2, is located at a position about 0.5 to 0.6 degree lower than a point H-V, which is a focal point in the direction of front of the lamp. A hot zone HZL, which is a high-intensity region, is formed in the low-beam light distribution pattern PL to surround the elbow point E.

As shown in FIG. 2B, the high-beam light distribution pattern PH is formed as a composite light distribution pattern of the low-beam light distribution pattern PL and an additional high-beam light distribution pattern PA. The additional high-beam light distribution PA spreads upward from the horizontal cut-off line CL1 and the oblique cut-off line CL2 of the low-beam light distribution pattern PL. The additional high-beam light distribution pattern PA is formed to have substantially the same spread as that of the low-beam light distribution pattern PL. A lower end portion of PA is formed in a straight line along the horizontal cut-off line CL1 and the oblique cut-off line CL2. A hot zone HZA, which is a high-intensity region, is formed in the additional high-beam light distribution pattern PA so as to surround the elbow point E.

A light distribution pattern of the entire vehicle headlamp 10 is a superimposition of six low-beam light distribution patterns PL or six high-beam light distribution patterns PH formed by light radiation from the respective six lamp units 20. Alternatively, low-beam and high-beam generated by any combination or permutation of the lamp units 20 may be used to form a pattern.

Figure 4:
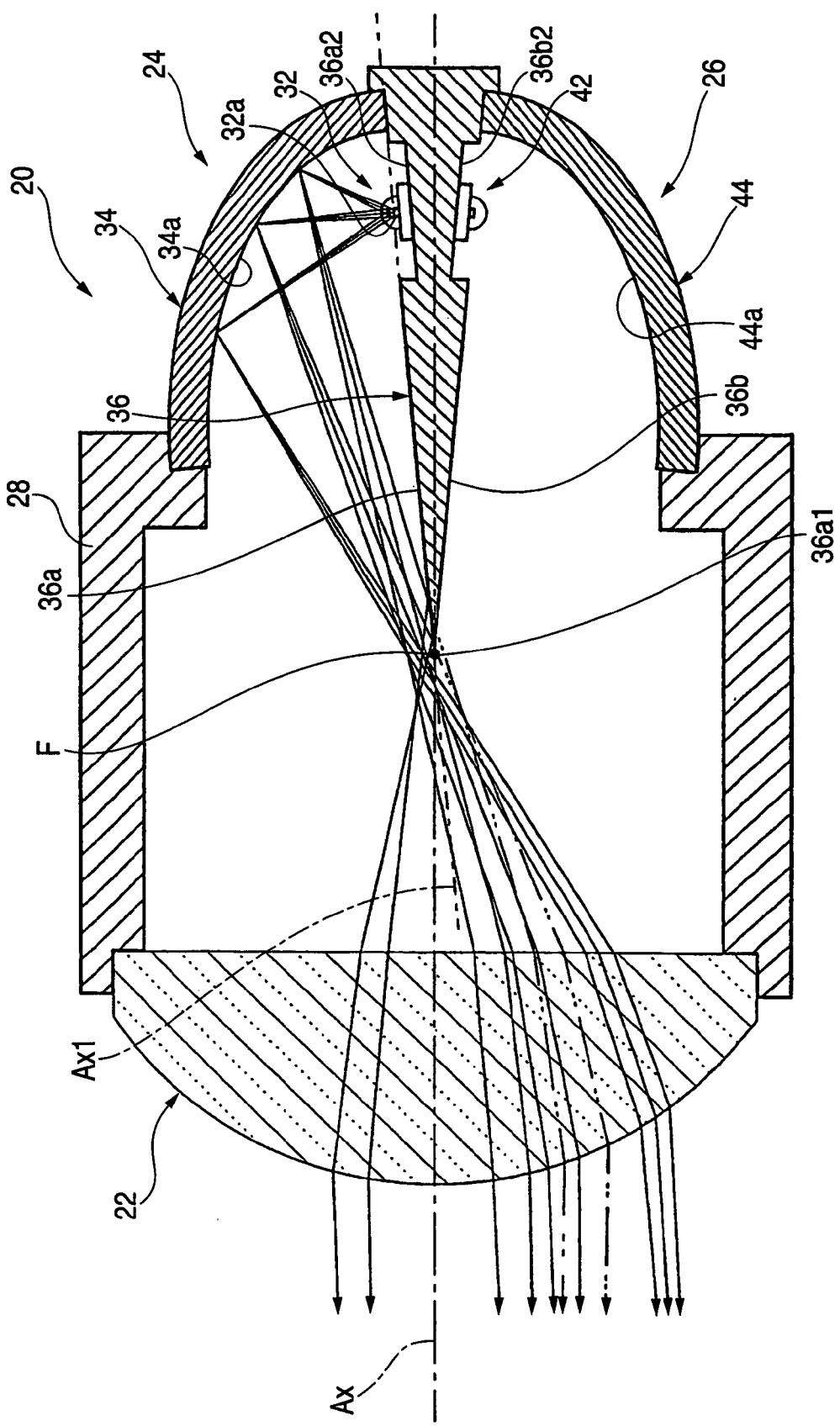
FIG. 4 is a side cross-sectional view of the lamp unit of the first exemplary, non-limiting embodiment of the present invention as a single article when the low-beam light is illuminated.
Figure 5:
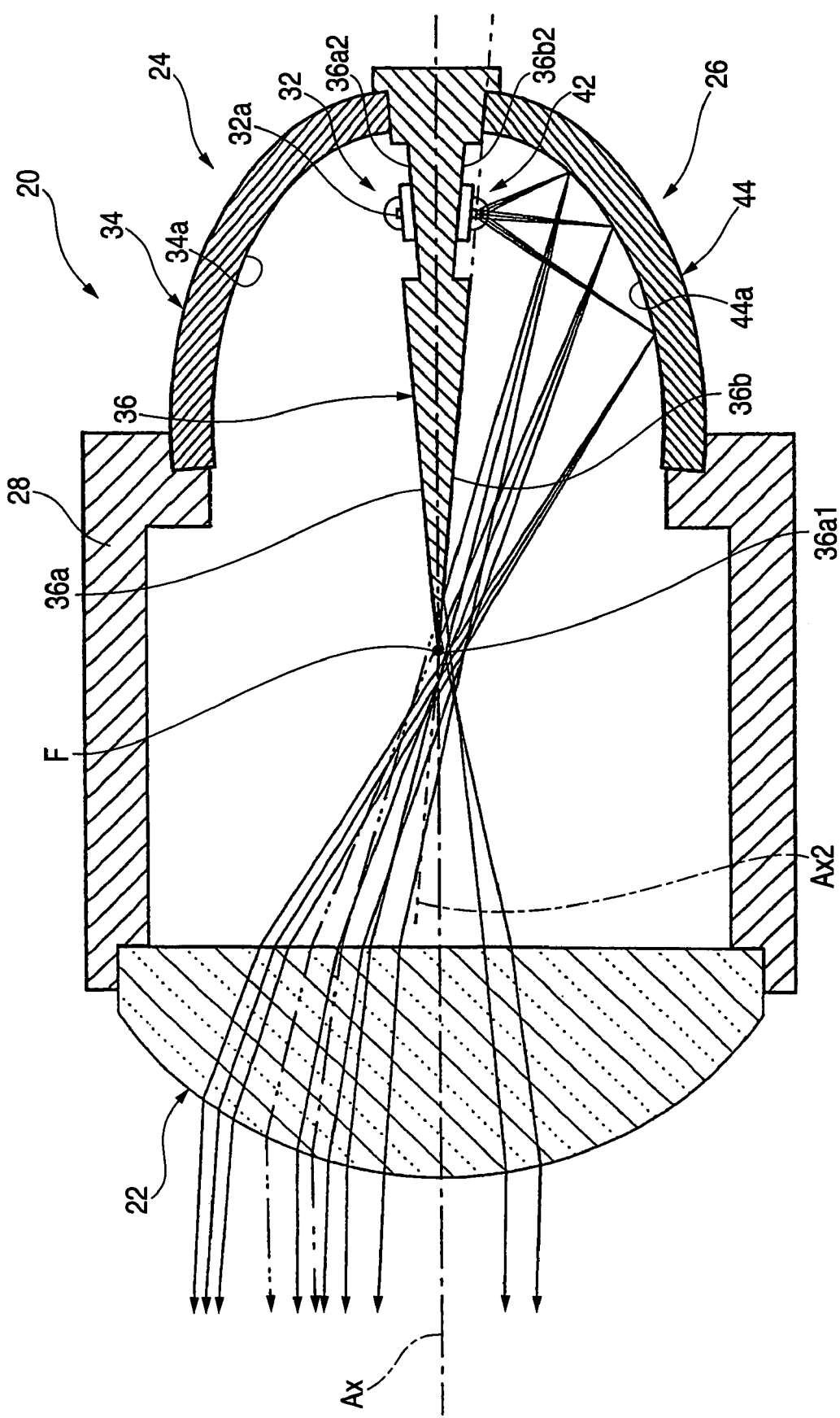
FIG. 5 is a side cross-sectional view of the lamp unit of the first exemplary, non-limiting embodiment of the present invention as a single article when the high-beam light is illuminated.

FIG. 3 is a front view showing the lamp unit 20 as a single article. FIGS. 4 and 5 are side cross-sectional views showing the lamp unit 20 as a single article. The lamp unit 20 includes a projection lens 22, a first light-source unit 24 and a second light-source unit 26, which are disposed to the rear of the projection lens 22, and a cylindrical holder 28 which connects the projection lens 22, the first light-source unit 24, and second light-source unit 26. The projection lens 22 is disposed on an optical axis Ax extending in an longitudinal direction of a vehicle (i.e., in a direction oriented about 0.5 to 0.6 degree downward with respect to the longitudinal direction of the vehicle).

FIG. 4 shows the lamp unit 20, including an optical path when the first light-source unit is illuminated. FIG. 5 shows the lamp unit 20, including an optical path when the second light-source unit is illuminated. The projection lens 22 is configured with a plano-convex lens having a convex surface as the front surface and a plane surface as the rear surface.

The first light-source unit 24 comprises a first semiconductor light-emitting element 32 as a light source, a first reflector 34, and a forward travel blocking member 36. A first reference axis Ax1, which is an optical axis of the first light-source unit 24, extends forward in a direction slightly downward from the optical axis Ax so as to pass through a rear focal point F of the projector lens 22.

Figure 6:
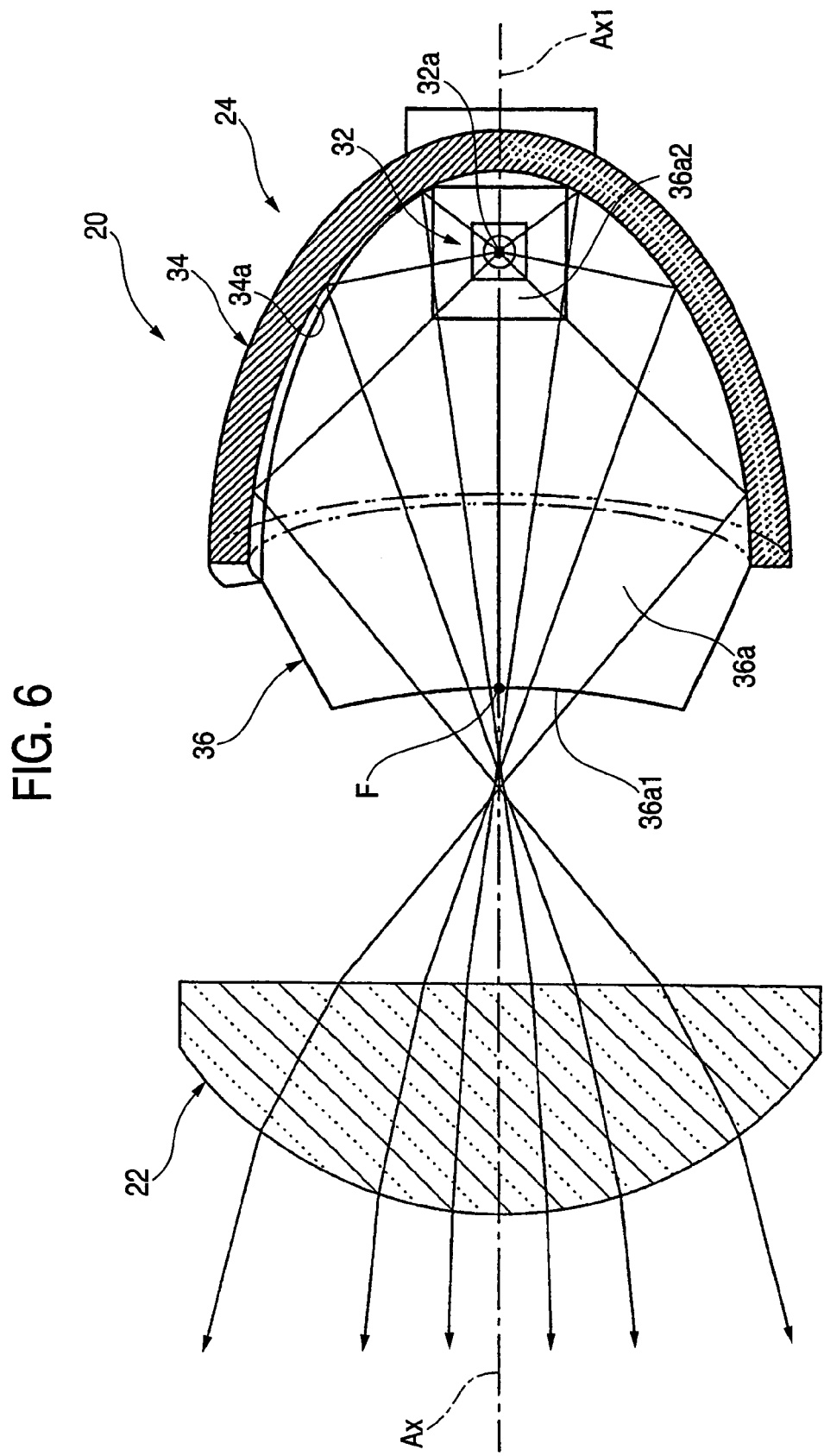
FIG. 6 is a horizontal cross sectional view of the lamp unit of the first exemplary, non-limiting embodiment of the present invention taken along a first reference axis Ax1 of a first light-source unit.

FIG. 6 shows a horizontal cross sectional view of the lamp unit 20 taken along the first reference axis Ax1 of the first light-source unit 24. The first semiconductor light-emitting element 32 is a white light-emitting diode having a light-emitting chip 32a, with an area that measures about 0.3 to 1 mm square. The first semiconductor light-emitting element 32 is disposed facing upward and perpendicular to the first reference axis Ax1 on the first reference axis Ax1.

The first reflector 34 is configured to reflect light from the first semiconductor light-emitting element 32 forward and close to the first reference axis Ax1, thereby substantially converging the light to a point in the vicinity of the rear focal point F of the projection lens 22. Specifically, a reflection surface 34a of the first reflector 34 is set such that a cross-sectional profile thereof including the first reference axis Ax1 is formed into a substantially oblate shape. An eccentricity of the reflection surface 34a is set to become gradually larger from the vertical cross section to the horizontal cross section. The reflection surface 34a is arranged to substantially converge light from the first semiconductor light-emitting element 32 to a point slightly forward of the rear focal point F.

When the lamp is viewed from the front, the forward travel blocking member 36 is a substantially wedge-shaped member formed substantially into a chevron shape. An upper surface 36a of the forward travel blocking member 36 extends rearward from the rear focal point F of the projection lens 22 along the first reference axis Ax1. The upper surface 36a is formed from a plane having a region which is on the left side with reference to the first reference axis Ax1 (i.e., on the right side when the lamp is viewed from the front) and which extends horizontally to the left from the first reference axis Ax1; and a plane having a region which is on the right side with reference to the first reference axis Ax1, and which extends obliquely downward (e.g., downward by an angle of 15°) to the right.

A front edge 36a1 of the upper surface 36a is formed in a substantially arc-shape along a rear focal plane of the projection lens 22. Reflection surface treatment such as aluminum deposition is applied on the upper surface 36a, whereby the upper surface 36a is configured as a reflection surface. On the upper surface 36a, a part of light reflected from the reflection surface 34a of the first reflector 34 is prevented from traveling forward and is reflected upward.

A portion near a rear end of the upper surface 36a of the forward travel blocking member 36 is configured as a recessed portion 36a2 which allows the light-emitting chip 32a of the first semiconductor light-emitting element 32 to be positioned on the first reference axis Ax1. In addition, the first reflector 34 is fixed on the forward travel blocking member 36 on a peripheral portion of the upper surface 36a.

Figure 7:
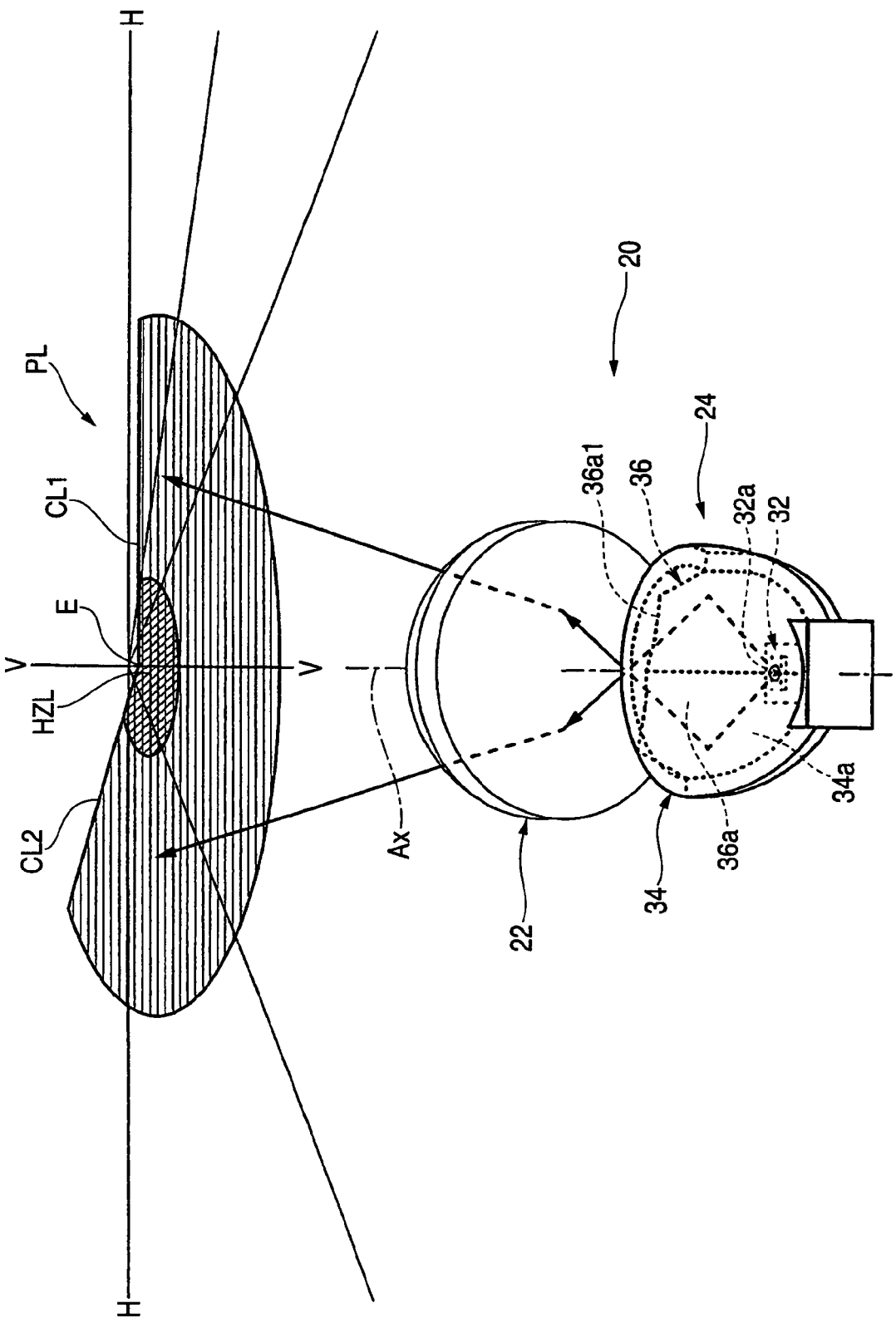
FIG. 7 is a rear perspective view of a low-beam light distribution pattern and the lamp unit formed by light radiated forward through a projection lens on a virtual vertical screen when a first light-source unit according to the first exemplary, non-limiting embodiment of the present invention is illuminated.

FIG. 7 shows a rear perspective view of the low-beam light distribution pattern PL and the lamp unit 20. The low-beam light distribution pattern PL is formed by light radiated forward from the lamp unit 20 through the projection lens 22 on the virtual vertical screen when the first light-source unit 24 is illuminated. The low-beam light distribution pattern PL forms the horizontal cut-off line CL1 and the oblique cut-off line CL2 as reverse projection images of the front edge 36a1 of the upper surface 36a of the forward travel blocking member 36. The upper surface 36a of the forward travel blocking member 36 is configured as a reflection surface.

Therefore, as shown by the two-dots chain line in FIG. 4, of light reflected from the reflection surface 36a of the first reflector 34, light to exit upward from the projection lens 22 is also utilized as light which exits downward from the projection lens 22 as shown by the solid line in FIG. 4. Thereby, a utilization ratio of a luminous flux of the light exited from the first semiconductor light-emitting element 32 is improved while the hot zone HZL is formed.

As shown in FIG. 5, the second light-source unit 26 comprises a second semiconductor light-emitting element 42 serving as a light source and a second reflector 44. A second reference axis Ax2, which is an optical axis of the second light-source-unit 26, extends forward in a direction slightly upward from the optical axis Ax so as to pass through the rear focal point F of the projector lens 22.

The second semiconductor light-emitting element 42 is completely identical in configuration with the first semiconductor light-emitting element 32. The second semiconductor light-emitting element 42 faces downward and is perpendicular to the second reference axis Ax2 on the second reference axis Ax2.

A central angle of the second reflector 44 is set comparatively smaller than that of the first reflector 34 when the lamp is viewed from the front. However, the reflection surface 44a is substantially identical in shape with the reflection surface 34a of the first reflector 34. The second reflector 44 is configured to reflect light from the second semiconductor light-emitting element 42 forward and close to the second reference axis Ax2, to thereby substantially converge the reflected light to a point in the vicinity of the rear focal point F (more specifically, a position slightly forward of the rear focal point F) of the projection lens 22.

In addition, the second light-source unit 26 is designed to utilize the forward travel blocking member 36—which is a constituent of the first light-source unit 24—as a reflecting member.

Specifically, an underside surface 36b of the forward travel blocking member 36 extends rearward from the rear focal point F of the projection lens 22 along the second reference axis Ax2. A front edge of the underside surface 36b is formed to coincide with the front edge 36a1 of the upper surface 36a. The underside surface 36b is formed from a plane having a region which is on the left side with reference to the second reference axis Ax2 and which extends horizontally to the left from the second reference axis Ax2, and a plane having a region which is on the right side with reference to the second reference axis Ax2 and which extends obliquely downward (e.g., downward by an angle of about 15°) to the right. Reflection surface treatment such as aluminum deposition is applied on the underside surface 36b, thereby configuring the underside surface 36b as a reflection surface. On the underside surface 36b, a part of light reflected from the reflection surface 44a of the second reflector 44 is prevented from traveling forward and is reflected downward.

When the second light-source unit 26 is illuminated, the additional high-beam light distribution pattern PA is formed, as shown in FIG. 2B, by light radiated forward from the lamp unit 20 through the projection lens 22. The underside surface 36b of the forward travel blocking member 36 is configured as a reflection surface. Therefore, as shown by the two-dots chain line in FIG. 5, of light reflected from the reflection surface 44a of the second reflector 44, light to exit downward from the projection lens 22 is also utilized as light exiting upward from the projection lens 22 as shown by the solid line in FIG. 5. Thereby, a utilization ratio of a luminous flux of the light exiting from the second semiconductor light-emitting element 42 is improved while the hot zone HZA is formed.

A portion near a rear end of the underside surface 36b of the forward travel blocking member 36 is configured as a recessed portion 36b2 which allows a light-emitting chip 42a of the second semiconductor light-emitting element 42 to be positioned on the second reference axis Ax2. In addition, the second reflector 44 is fixed on the forward travel blocking member 36 on a peripheral portion of the underside surface 36b.

As described in detail above, the vehicle headlamp 10 of the first exemplary, non-limiting embodiment of the present invention comprises the six lamp units 20, each configured as a projector-type lamp unit provided with the projection lens 22 disposed on the optical axis Ax extending in an longitudinal direction of a vehicle, and the first light-source unit 24 and the second light-source unit 26 which are disposed in the rear of the projection lens 22; and performs two types of light distribution functions. However, the present invention is not limited thereto. Therefore, at least the following working effects can be obtained.

When the first light-source unit 24 is illuminated, light from the first semiconductor light-emitting element 32—which faces substantially upward on the first reference axis Ax1 extending substantially in the longitudinal direction of the vehicle—is substantially converged in the vicinity of the rear focal point F of the projection lens 22 after being reflected forward and close to the first reference axis by the first reflector 34. However, a part of the reflected light is prevented from traveling forward by the forward travel blocking member 36 which is formed so as to extend rearward from the rear focal point F of the projection lens 22 in a surface shape. Accordingly, there can be formed the low-beam light distribution pattern PL having the sharp cut-off lines CL1 and CL2 on an upper portion as reverse projection images of the front edge 36a1 of the upper surface 36a of the forward travel blocking member 36.

In addition, when the second light-source unit 26 is illuminated, light from the second semiconductor light-emitting element 42—which is disposed substantially downward on the second reference axis Ax2 extending substantially in the longitudinal direction of the vehicle—is substantially converged in the vicinity of the rear focal point F of the projection lens 22 after being reflected forward and close to the second reference axis Ax2 by the second reflector 44. Accordingly, there can be formed the additional high-beam light distribution pattern PA which is spread upward from the cut-off lines CL1 and CL2.

As described hitherto, when the first light-source unit 24 is illuminated, the low-beam light distribution pattern PL having the sharp cut-off lines CL1 and CL2 can be formed. Further, when the second light-source unit 26 is additionally illuminated, the high-beam light distribution pattern PH—which is a composite light distribution pattern of the low-beam light distribution pattern PL and the additional high-beam light distribution pattern PA—can be formed. Therefore, a brightness substantially equal to that achieved when a low-beam lamp unit and a high-beam lamp unit are independently configured can be secured while the number of the lamp units 20 to be disposed is suppressed. Further, the first light-source unit 24 and the second light-source unit 26 are disposed adjacently with respect to the vertical direction. Accordingly, the above-mentioned working effect can be obtained while the lamp unit 20 is maintained at a compact size.

Furthermore, the upper surface 36a of the forward travel blocking member 36 of the first light-source unit 24 is configured as a reflection surface. Accordingly, light entering the upper surface 36a of the forward travel blocking member 36 after having been reflected on the first reflector 34 can be reflected on the upper surface 36a, thereby causing the reflected light to enter the projection lens 22. As a result, the low-beam light distribution pattern PL can be brightened further.

The underside surface 36b of the forward travel blocking member 36 is formed to extend rearward from the vicinity of the rear focal point of the projector lens, thereby reflecting a part of the light reflected from the second reflector 44 of the second light-source unit 26. Accordingly, light entering the underside surface 36b after having been reflected on the second reflector 44 can be reflected on the underside surface 36b, thereby causing the reflected light to enter the projection lens 22. As a result, the additional high-beam light distribution pattern PA and the resultant high-beam light distribution pattern PH can be brightened further.

In the above description, the forward travel blocking member 36 is shared by the first light-source 24 and the second light-source unit 26. Therefore, when the forward travel blocking member 36 is formed in a substantially wedge shape, the front edge of the underside surface 36b thereof can be easily made to coincide with the front edge 36a1 of the upper surface 36a. Accordingly, after the underside surface 36b of the forward travel blocking member 36 has been used as a reflection surface, the additional light distribution pattern PA can be formed so as not to be separated from the cut-off lines CL1 and CL2 of the low-beam light distribution pattern PL. As a result, the high-beam light distribution pattern PH can be configured while preventing formation of an unilluminated zone in the high-beam light distribution pattern.

The front edge 36a1 of the upper surface 36a of the forward travel blocking member 36 is formed in a substantially arc-shape along the rear focal plane of the projection lens 22. Therefore, even in the case where a field curvature of the projection lens 22 is large, the cut-off lines CL1 and CL2 can be formed sharply.

The embodiment has been described such that the six lamp units 20 are arranged in two rows consisting of an upper row and a lower row, three lamp units for each row; however, as a matter of course, other numbers and arrangements of the lamp units 20 may be employed.

The first exemplary, non-limiting embodiment of the present invention has also been described such that all the six lamp units 20 are substantially identical in configuration. However, by setting focal distances of the projection lenses 22 at different values for the respective lamp units 20 or the like, the low-beam light distribution pattern PL and the additional high-beam light distribution pattern PA can be formed in different sizes for the respective lamp units 20.

In the embodiment, all six lamp units 20 are of a projector-type; however, some of the lamp units 20 can by configured as lamp units of a different type (e.g., a so-called parabola-type lamp unit).

Figure 8:
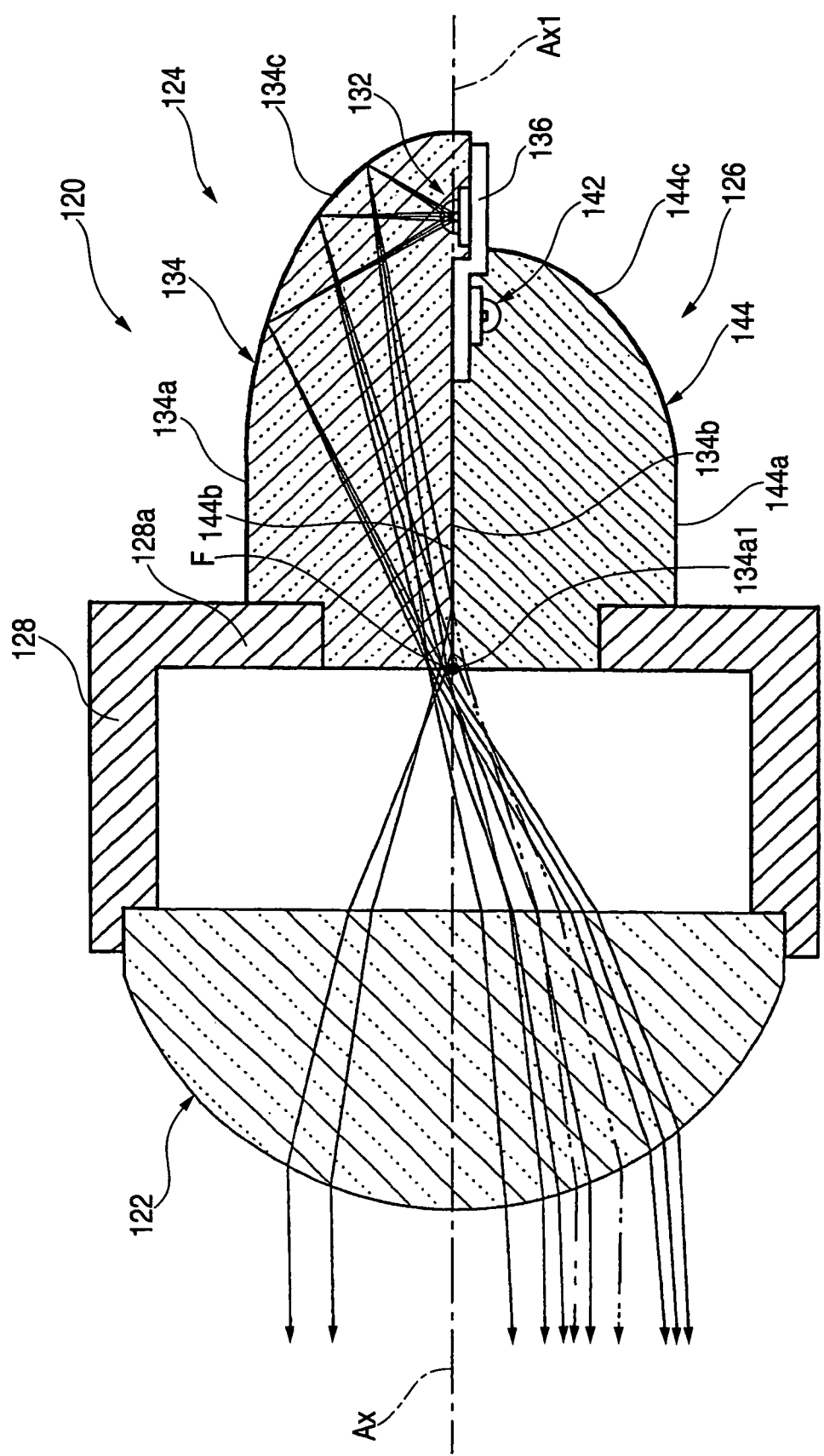
FIG. 8 is a view, which is analogous to FIG. 4, showing the lamp unit of a second exemplary, non-limiting embodiment of the present invention.
Figure 9:
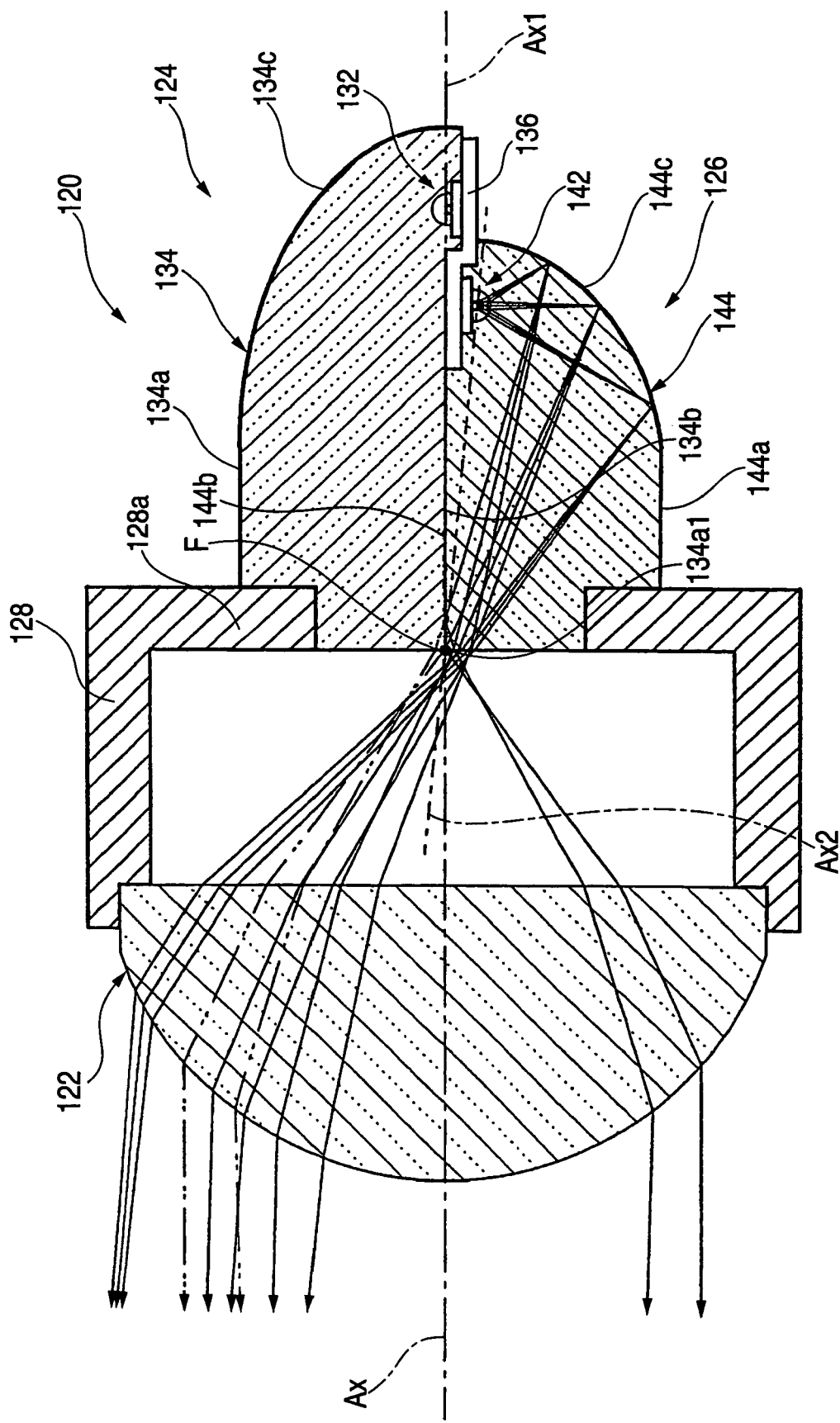
FIG. 9 is a view, which is analogous to FIG. 5, showing the lamp unit of the second exemplary, non-limiting embodiment of the present invention.

Next, a second exemplary, non-limiting embodiment of the present invention will be described. FIGS. 8 and 9 are views, which are analogous to FIGS. 4 and 5, showing a lamp unit 120 of the second embodiment. The lamp unit 120 comprises, as in the case with the lamp unit 20 of the embodiment, a projection lens 122, a first light-source unit 124 and a second light-source unit 126 which are disposed to the rear of the projection lens 122, and a cylindrical holder 128. The cylindrical holder 128 connects the projection lens 122, the first light-source unit 124, and a second light-source unit 126. However, specific configurations of the respective elements differ from those of the aforementioned first exemplary, non-limiting embodiment of the present invention.

As shown in FIG. 8, the first light-source unit 124 comprises a first semiconductor light-emitting element 132 and a first translucent block 134. The first reference axis Ax1 of the first light-source unit 124 extends coaxially with the optical axis Ax.

The first semiconductor light-emitting element 132 is similar in configuration to the first semiconductor light-emitting element 32. The first semiconductor light-emitting element 132 is supported by a substrate 136 facing vertically upward on the first reference axis Ax1.

The first translucent block 134 is made of a transparent molded plastic formed to seal the first semiconductor light-emitting element 132 and the substrate 136 from above. The first translucent block 134 provides similar functions of light distribution to that of the first reflector 34 and the forward travel blocking member 36 of the first embodiment.

More specifically, reflection surface treatment such as aluminum deposition is applied on an upper surface 134a of the first translucent block 134 except for a region near a front end thereof. Accordingly, there is configured a reflection surface 134c which reflects light from the first semiconductor light-emitting element 132 forward and close to the first reference axis Ax1, thereby substantially converging the reflected light to a point in the vicinity of the rear focal point F (more specifically, a point slightly forward of the rear focal point F) of the projection lens 122.

An underside surface 134b of the first translucent block 134 extends rearward from the rear focal point F of the projection lens 122 along the first reference axis Ax1. The underside surface 134b is formed with a plane having a region which is on the left side with reference to the first reference axis Ax1 and which extends horizontally to the left from the first reference axis Ax1, and a plane having a region which is on the right side with reference to the first reference axis Ax1, and which extends obliquely downward (e.g., downward by an angle of 15°) to the right. A front edge 134b1 of the underside surface 134b is formed in a substantially arc-shape along a rear focal plane of the projection lens 22.

The first translucent block 134 prevents a part of light reflected from the reflection surface 134c of the first translucent block 134 from traveling forward and reflects the light upward on the underside surface 134b. The reflection on the underside surface 134b is caused by an internal reflection.

Meanwhile, as shown in FIG. 9, the second light-source unit 126 comprises a second semiconductor light-emitting element 142 and a second translucent block 144. A second reference axis Ax2, which is an optical axis of the second light-source unit 126, extends forward in a slightly upward direction from the optical axis Ax so as to pass through the rear focal point F of the projector lens 122.

The second semiconductor light-emitting element 142 is similar in configuration to the first semiconductor light-emitting element 132. The second semiconductor light-emitting element 142 is supported by the substrate 136 so as to face vertically downward on the second reference axis Ax2 while being positioned forward of the first semiconductor light-emitting element 132.

The second translucent block 144 is made of a transparent molded plastic which is formed so as to seal the second semiconductor light-emitting element 142, the substrate 136, and the first translucent block 134 from below. The second translucent block 144 provides functions of light distribution similar to those of the first reflector 44 and the forward travel blocking member 36 of the first embodiment.

Reflection surface treatment such as aluminum deposition is applied on an underside surface 144a of the second translucent block 144 except for a region near a front end thereof. Accordingly, there is configured a reflection surface 144c which reflects light from the second semiconductor light-emitting element 142 forward and close to the second reference axis Ax2, thereby substantially converging the reflected light to a point in the vicinity of the rear focal point F (more specifically, a point slightly forward of the rear focal point F) of the projection lens 122.

An upper surface 144b of the second translucent block 144 extends rearward from the rear focal point F of the projection lens 122 along the optical axis Ax so as to come into close contact with the underside face 134a of the first translucent block 134. The second translucent block 144 prevents, on the upper surface 144b, a part of light reflected from the reflection surface 144c of the second translucent block 144 from traveling straight and reflects the light downward. Reflection on the upper surface 144b is caused by internal reflection.

The projection lens 122 is set to have a focal distance shorter than that of the projection lens 22 of the embodiment. The reason for the above is to correspond to refraction of light—which has exited from the first light-source unit 124 and the second light-source unit 126—in a direction away from the optical axis Ax from front end faces of the first translucent block 134 and the second translucent block 144.

The holder 128 is configured so that a rear end portion 128a of the holder 128 penetrates to the front end portions of the first translucent block 134 and the second translucent block 144 to some extent. Accordingly, light reflected on regions other than the reflecting surfaces 134c and 144c of the upper surface 134a of the first translucent block 134 and the underside surface 144a of the second translucent block 144 is blocked from entering the projection lens 122.

When a configuration of the second embodiment is employed, as in the case with the embodiment, when the first light-source unit 124 is illuminated, there can be formed the low-beam light distribution pattern PL having the sharp cut-off lines CL1 and CL2 as reverse projection images of the front edge 134b1 of the underside surface 134b of the first translucent block 134. When the second light-source unit 26 is additionally illuminated, there can be formed the high-beam light distribution pattern PH which is a composite light distribution pattern of the low-beam light distribution pattern PL and the additional high-beam light distribution pattern PA. Accordingly, while suppressing a number of the lamp units 120 to be disposed, there can be ensured a brightness substantially equal to that attained when a low-beam lamp unit and a high-beam lamp unit are configured independently. Further, the first light-source unit 124 and the second light-source unit 126 are disposed adjacently with respect to the vertical direction, whereby the above-mentioned working effect can be obtained while the lamp unit 120 is maintained at a compact size.

Furthermore, in the second exemplary, non-limiting embodiment of the present invention, the single first translucent block 134 serves as the first reflector 34—which configures the first light-source unit 24 of the second embodiment—and the forward travel blocking member 36. Accordingly, miniaturization and reduction in the number of components of the first light-source unit 124 can be achieved. In addition, a positional relation between the reflecting surface 134c of the first translucent block 134 and the front edge 134b1 of the underside surface 134b thereof can be set accurately, whereby the cut-off lines CL1 and CL2 of the low-beam light distribution pattern PL can be formed sharply.

In the second exemplary, non-limiting embodiment of the present invention, the single second translucent block 144 serves as the second reflector 44—which is a constituent of the second light-source unit 26—and the forward travel blocking member 36. Accordingly, miniaturization and the number of components of the second light-source unit 126 can be reduced.

Furthermore, in the second exemplary, non-limiting embodiment of the present invention, the first semiconductor light-emitting element 132 and the second semiconductor light-emitting element 142 are positioned so as to deviate in a longitudinal direction. Therefore, the first reference axis Ax1 of the first light-source unit 124 can be made to coincide with the optical axis Ax of the projection lens 122 while causing the second reference axis Ax2 of the second light-source unit 126 to be closer to the axes. Accordingly, a position where light from the first light-source unit 124 and the second light-source unit 126 enters the projection lens 122 can be set so as not to deviate greatly from the optical axis Ax. As a result, an outer diameter of the projection lens 122 can be suppressed to a small size.

Particularly, as in the case of the second embodiment, when light from the first light-source unit 124 and the second light-source unit 126 is refracted in a direction away from the optical axis Ax from the front end faces of the first translucent block 134 and the second translucent block 144, causing the first reference axis Ax1 and the second reference axis Ax2 to be placed close to the optical axis Ax, which is effective for suppressing an outer diameter of the projection lens 122.

In the second exemplary, non-limiting embodiment of the present invention, as in the case with the first embodiment, light reflected from the underside surface 134*b* of the first translucent block 134 and the upper surface 144*b* of the second translucent block 144 is utilized. However, an incidence angle from the reflecting surface 134*c* of the first translucent block 134 into the underside surface 134*b* and an incidence angle from the reflecting surface 144*c* of the second translucent block 144 into the upper surface 144*b* are sufficiently large. Therefore, light can be reflected by utilizing the internal reflection without applying reflection surface treatment on the underside surface 134*b* of the first translucent block 134 and the upper surface 144*b* of the second translucent block 144.

The "semiconductor light-emitting element" is not limited to any specific type. For example, a light-emitting diode, a laser diode, or the like can be employed.

The "cut-off line" is not limited to a specific shape. For example, there can be employed a shape formed from a horizontal cut-off line extending horizontally and an oblique cut-off line extending obliquely upward from the horizontal cut-off line, or a shape where a pair of right and left horizontal cut-off lines are arranged in the shape of a stairway.

The "forward travel blocking member" is not limited to a specific configuration, so long as it is a member formed into a shape extending rearward from the vicinity of the rear focal point of the projector lens and is configured so as to block a part of the light reflected from the first reflector. For example, there can be employed a forward travel blocking member configured as a shielding member so as to shield a part of the reflected light, or that configured as a reflecting member.

In the present invention, a function of preventing (or blocking) light from traveling forward is provided. This function is performed by the structure of the forward travel blocking member 36 in the first exemplary, non-limiting embodiment of the present invention. Alternatively, this function may be performed by the first translucent block 134 in the second exemplary, non-limiting embodiment of the present invention.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

The invention claimed is:

1. A vehicle headlamp configured to form a light distribution pattern by light radiation from at least one lamp unit comprising:
    at least one semiconductor light-emitting element as a light-source;
    a projection lens disposed on an optical axis extending in a longitudinal direction of a vehicle; and
    a first light-source unit and a second light-source unit each disposed rearward of the projection lens, wherein,
    the first light-source unit comprises:
        a first semiconductor light-emitting element facing substantially upward on a first reference axis extending substantially in the longitudinal direction;
        a first reflector configured to reflect light from the first semiconductor light-emitting element forward and substantially near the first reference axis to substantially converge the reflected light substantially near a rear focal point of the projection lens; and
        a forward travel blocking member extending rearward from substantially near the rear focal point to prevent the light reflected by the first reflector from traveling forward,
    the second light-source unit comprises:
        a second semiconductor light-emitting element facing substantially downward on a second reference axis extending substantially in the longitudinal directions; and
        a second reflector configured to reflect light from the second semiconductor light-emitting element forward and substantially near the second reference axis to substantially converge the reflected light substantially near the rear focal point, and
    when the first light-source unit is illuminated a low-beam light distribution pattern having cut-off lines at an upper end portion as reverse projection images of a front edge of the forward travel blocking member is formed, and a high-beam light distribution pattern spreading upward from the cut-off line is formed upon illumination of the second light-source unit.

2. The vehicle headlamp according to claim 1, wherein a surface of the forward travel blocking member is a reflecting surface.

3. The vehicle headlamp according to claim 1, wherein the second light-source unit comprises a reflecting member having a surface shape and extending rearward from the vicinity of the projection lens to reflect a part of light reflected from the second reflector.

4. The vehicle headlamp according to claim 3, wherein the forward travel blocking member and the reflecting member are integral with respect to each other.

5. The vehicle headlamp according to claim 3, wherein the second reflector and the reflecting member are a second translucent block.

6. The vehicle headlamp according to claim 1, wherein the first reflector and the forward travel blocking member are a first translucent block.

7. The vehicle headlamp according to claim 1, wherein the first semiconductor light-emitting element and the second semiconductor light-emitting element are deviated in a longitudinal direction.

8. The vehicle headlamp according to claim 1, wherein the first semiconductor light-emitting element is arranged such that light emitted from the first semiconductor light-emitting element is not reflected by the second reflector.

9. The vehicle headlamp according to claim 1, wherein the first reference axis and the second reference axis are not parallel to the optical axis.

10. A vehicle headlamp that forms a light distribution pattern by light radiation from at least one lamp unit that comprises:
    at least one semiconductor light-emitting element as a light-source;
    a projection lens disposed on an optical axis extending in a longitudinal direction of a vehicle;
    a first light-source unit comprising:
        a first semiconductor light-emitting element facing substantially upward on a first reference axis extending substantially in the longitudinal direction; and
        a first reflector configured to reflect light from the first semiconductor light-emitting element forward and substantially near the first reference axis to substantially converge the reflected light substantially near a rear focal point of the projection lens;

a second light-source unit comprising:

a second semiconductor light-emitting element facing substantially downward on a second reference axis extending substantially in the longitudinal direction; and a second reflector configured to reflect light from the second semiconductor light-emitting element forward and substantially near the second reference axis to substantially converge the reflected light substantially near the rear focal point; and means for preventing light reflected by said first reflector from traveling forward;

wherein the first light-source unit and the second light-source unit are disposed rearward of the projection lens, and when the first light-source unit is illuminated a low-beam light distribution pattern having cut-off lines at an upper end portion as reverse projection images of a front edge of the means for preventing is formed, and a high-beam light distribution pattern spreading upward from the cut-off line is formed upon illumination of the second light-source unit.

11. The vehicle headlamp of claim 10, wherein said means for preventing comprises one of a blocking member and a translucent block.

12. The vehicle headlamp according to claim 11, wherein a surface of the blocking member is reflective.

13. The vehicle headlamp according to claim 10, wherein the means for preventing and the reflecting member are integral with respect to each other.

14. The vehicle headlamp according to claim 10, wherein the first reflector and the means for preventing are a first translucent block.

15. The vehicle headlamp according to claim 10, wherein the second reflector and the reflecting member are a second translucent block.

16. The vehicle headlamp according to claim 10, wherein the first semiconductor light-emitting element and the second semiconductor light-emitting element are deviated in a longitudinal direction.

17. A vehicle headlamp comprising:

a projection lens disposed on an optical axis extending in a longitudinal direction of a vehicle; and a first light-source unit and a second light-source unit each disposed rearward of the projection lens;

wherein the first light-source unit comprises:

a first semiconductor light-emitting element facing substantially upward on a first reference axis extending substantially in the longitudinal direction;

a first reflector configured to reflect light from the first semiconductor light-emitting element forward and substantially near the first reference axis to substantially converge the reflected light substantially near a rear focal point of the projection lens; and a forward travel blocking member to prevent the light reflected by the first reflector from traveling forward, wherein the second light-source unit comprises:

a second semiconductor light-emitting element facing substantially downward on a second reference axis extending substantially in the longitudinal direction; and a second reflector configured to reflect light from the second semiconductor light-emitting element forward and substantially near the second reference axis to substantially converge the reflected light substantially near the rear focal point;

wherein when the first light-source unit is illuminated a low-beam light distribution pattern having cut-off lines at an upper end portion as reverse projection images of a front edge of the forward travel blocking member is formed; and wherein when the second light-source unit is illuminated a high-beam light distribution pattern spreading upward from the cut-off line is formed.

* * * * *